[11] 3,590,713

[72] Inventors Lothar Kirstein
Bad Kreuznach;
Gerd Kurz, Biebelsheim, both of, Germany
[21] Appl. No 821,706
[22] Filed May 5, 1969
[45] Patented July 6, 1971
[73] Assignee Jos. Schneider & Co.
Bad Kreuznach, Germany
[32] Priority May 4, 1968
[33] Germany
[31] P 12 85 287.8

[54] ADJUSTABLE SEATING FOR OPTICAL COMPONENTS
10 Claims, 9 Drawing Figs.
[52] U.S. Cl. .................................................. 95/45, 350/187
[51] Int. Cl. .................................................. G03b 3/00
[50] Field of Search .......................................... 95/45, 44; 350/187

[56] References Cited
UNITED STATES PATENTS
3,224,351  12/1965  Strasser ................... 95/45

*Primary Examiner*—Samuel S. Matthews
*Assistant Examiner*—Richard L. Moses
*Attorney*—Karl F. Ross ABSTRACT: An optical objective in a camera, whose backfocal length is subject to change by the addition of supplemental lenses, is provided with a support that is axially displaceable along guide rails and, with the aid of a first knob, can be arrested in several axial positions for coarse adjustment. A second knob, controlling a leadscrew or a nut therefor, serves to carry out fine adjustment of the support' position for accurate focusing. A third knob immobilizes the objective support in its selected position of fine adjustment. The three knobs, or at least two of them, are mounted on a common axis transverse to the guide rails.

PATENTED JUL 6 1971 3,590,713
SHEET 1 OF 3
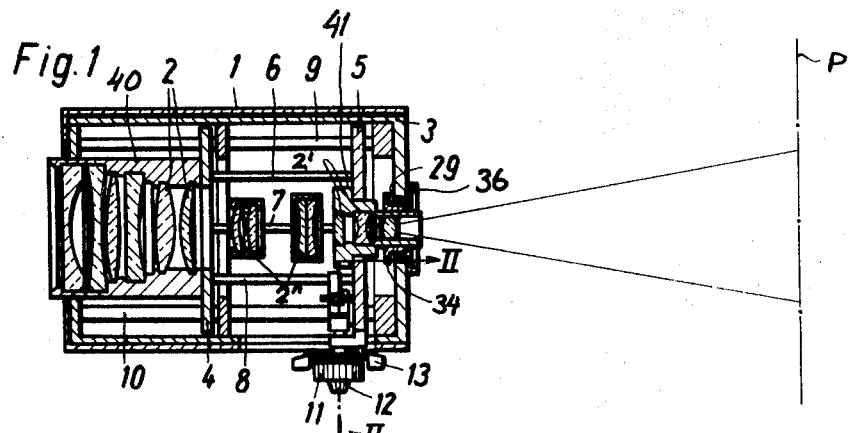
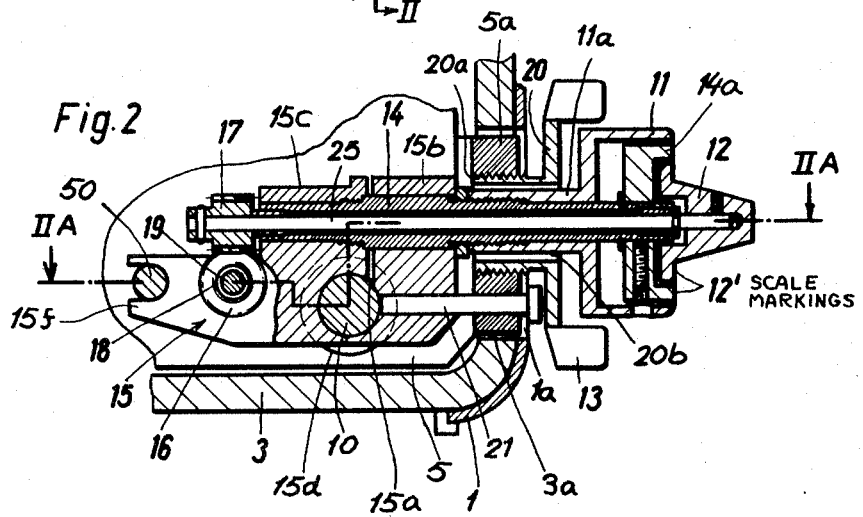
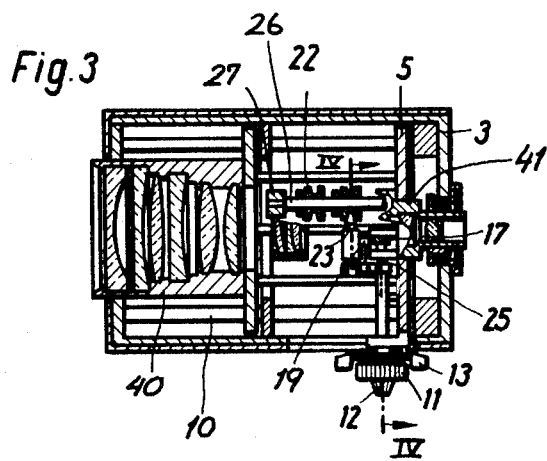
Lothar Kirstein
Gerd Kurz
Inventors.
By
Karl F. Ross
Attorney

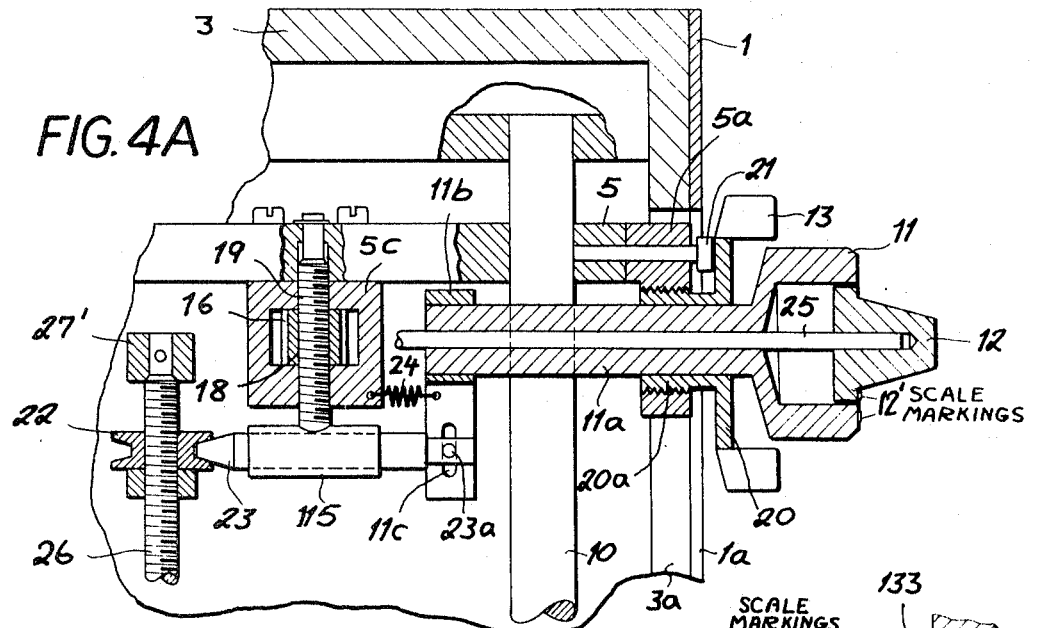
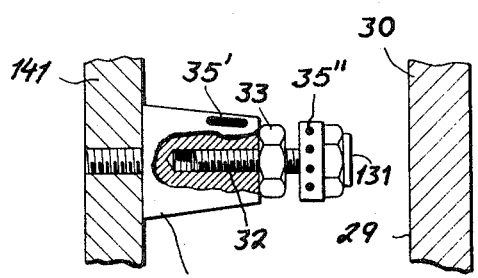
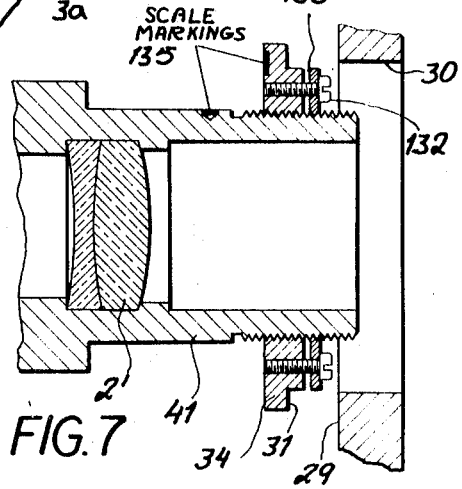
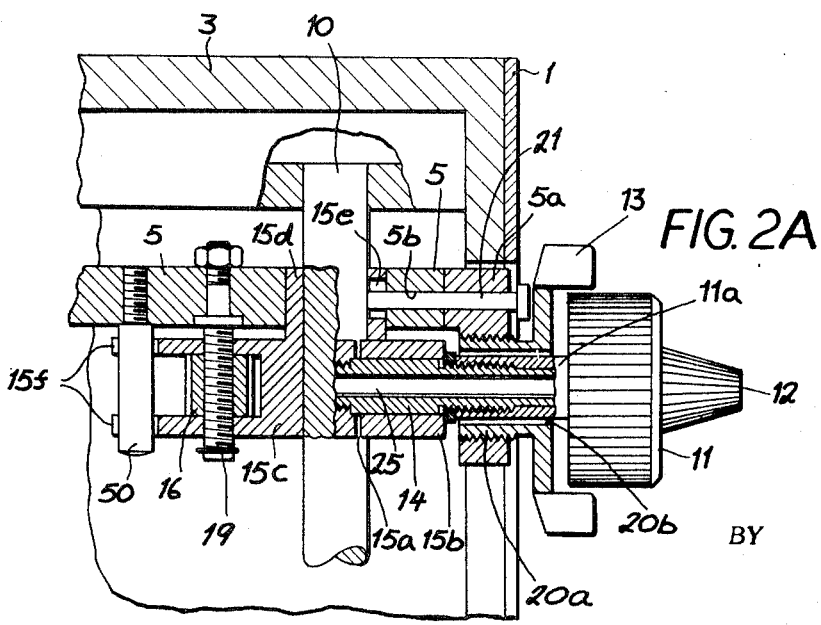

Lothar Kirstein
Gerd Kurz
Inventors.

By Karl F. Ross
Attorney

ADJUSTABLE SEATING FOR OPTICAL COMPONENTS

Our present invention relates to an adjustable seating for optical components, more specifically for a lens assembly forming part of an objective in a photographic, cinematographic or television camera.

In such cameras it is sometimes necessary to change the back-focal length of the objective, e.g. for the purpose of extending the focal range of a zoom lens or to provide wide-angle or telephoto effects. This is frequently done by inserting a supplemental component of one or more lenses between two widely separated lenses of the basic objective, or between the last vertex of that objective and the image plane of the camera. The resulting modification of the effective image distance must be compensated by an axial shift of the main objective. This shifting, in turn, makes it necessary to provide means for ensuring the correct seating of the objective in any of its alternate positions.

Earlier systems designed for the selected immobilization of a lens assembly in different axial positions were relatively cumbersome and usually required manipulation with both hands.

The general object of our invention is to provide a simplified mechanism for the purpose set forth which will, nevertheless, enable a quick preliminary adjustment and an accurate final focusing of the objective in its new position.

More specifically, our invention aims at providing a system allowing these operations, as well as a final locking step, to be carried out by the operator with the use of only one hand.

In accordance with our instant invention, we provide one or more rails or other elongate members extending axially in an objective housing for the guidance or a lens support, the latter having one or more guided members riding on these guide members. The guiding and guided structures are interconnectable by releasable coupling means in tandem with a leadscrew drive centered on an axis parallel to the guide rails, one of the threaded elements (i.e. the screw or the nut) of that drive being axially fixed with reference to either the guiding or the guided structure; the second threaded element is axially immobilizable with reference to the other structure by the releasable coupling means in different relative axial positions of the two structures. A first knob or similar manual actuator serves for the manipulation of the releasable coupling means, a second such actuator being provided to manipulate the leadscrew drive. Thus, by the alternate operation of these two actuators, the lens support may be first released from its previous position, then arrested in approximately its desired new position and thereafter precisely adjusted.

A third actuator may be used, pursuant to another feature of our invention, to clamp the lens support to a member of the guiding structure, such as one of the guide rails thereof. This third actuator may comprise a knob adapted to bear upon a pin that is longitudinally slidable alongside a common axis, transverse to the guide rails, on which the three knobs (or at least two of them) are centered for independent rotation and/or axial displacement.

For more rapid preliminary adjustment, means may be provided to index the lens support in one of several axial positions. The indexing means may form part of the releasable coupling means and, in that instance, may include a detent formation controlled by the first knob, this detent formation being selectively engageable with any of several axially spaced indexing formations carried on an axially extending rod or on the spindle of the leadscrew drive. The mobile assembly may also be arrested, upon the release of the coupling means, in a terminal position of minimum back-focal length in which a stop on the guided structure coacts with a stop on the objective housing; at least one of these stops is advantageously constituted by an axially adjustable abutment.

The above and other features of our invention will become more fully apparent from the following detailed description of certain embodiments, reference being made to the accompanying drawing in which:

FIG. 1 is an axial sectional view of a camera objective embodying our invention;

FIG. 2 is an enlarged fragmentary sectional view taken on the line II–II of FIG. 1;

FIG. 2A is another sectional detail view taken on the line IIA–IIA of FIG. 2;

FIG. 3 is a view similar to FIG. 1, showing another embodiment;

FIG. 4A is a view similar to FIG. 2A, taken on the line IVA–IVA of FIG. 4;

FIGS. 6 and 7 are enlarged detail views of certain modifications in the structures of the preceding embodiments.

Figure 4:
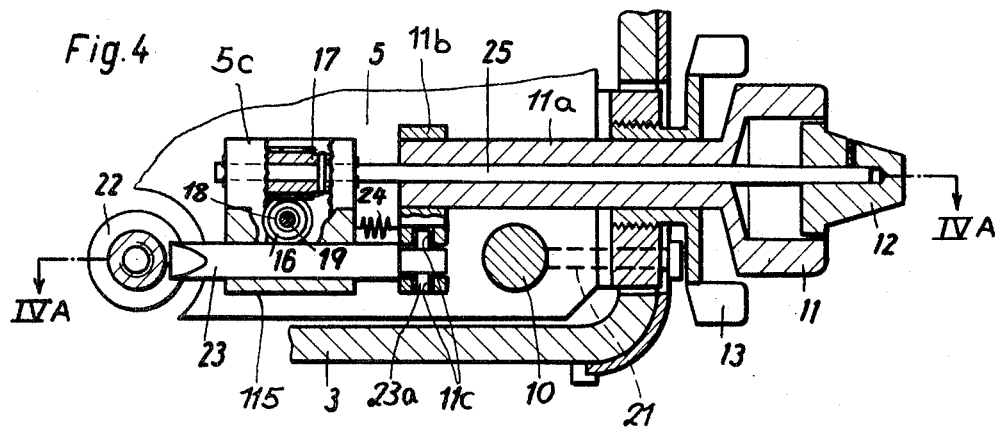
FIG. 4 is a fragmentary view similar to FIG. 2, taken on the line IV–IV of FIG. 3.

In FIGS. 1, 2 and 2A we have shown part of a camera comprising an objective housing 1 along whose axis a lens holder 40, supporting an objective 2, is slidably guided by a pair of diametrically opposite rails 9 and 10 which are rigid with a detachable insert 3 effectively forming part of the housing. The lens support 40 is rigid with a cage consisting of a pair of transverse plates 4, 5 interconnected by axially extending rods 6, 7, 8 which are equispaced about the lens axis. Plate 5 forms a seat for an ancillary lens mount 41 carrying a further lens group 2'; supplemental components 2'', optionally insertable between the lens groups 2 and 2' for joint displacement therewith, are disposed within the cage with the aid of similar lens mounts illustrated only in part.

At P we have shown the image plane of the camera upon which the rays of objective 2 are to be focused in the presence or absence of any of the supplemental components 2', 2''. In order to ensure such focusing, the lens support 40 must be immobilized in different axial positions along the rails 9, 10, for which purpose we provide three independently manipulatable knobs 11, 12, 13 all substantially centered on a common axis transverse to the lens axis. Details of the construction of these knobs and associated elements are shown in FIGS. 2 and 2A.

Knob 11 is rigid with a tubular stem 11a threadedly engaging an inner tube 14 within which a stem 25 of knob 12 is nested. Knob 13 has a disc-shaped body 20 with a tubular boss 20a loosely surrounding the stem 11a while being threadedly received in a slider rigid extension 5a of plate 5 movable in a slot 3a of insert 3. The nested members 25, 14, 11a and 20a also pass through a slot 1a of the outer shell 1 of the housing. The clearance 20b around stem 11a affords limited relative transverse mobility, in a direction parallel to rail 10, between this stem and boss 20a.

A slider 15 is partly split at 15a to form a pair of integrally connected clamp jaws 15b, 15c. With tube 14 anchored to jaw 15c and boss 20a bearing upon jaw 15b, a rotation of knob 11 to tension the tube 14 tightens these jaws around the rail 10. Thus, a turning of knob 11 in one sense or the other causes the slider 15 to release or to grip the rail 10, the slider in its released state being freely movable over the length of housing slot 1a.

Clamp jaw 15c is rigid with an apertured tubular member 15d which surrounds the rail 10 and, together with that rail, slidably traverses the plate 5. This plate and its extension 5a have a transverse bore 5b accommodating a pin 21 whose tip, traversing a lateral slot 15e of tube 15d, points toward the rail 10 and is engageable therewith under pressure of a peripheral portion of disc 20 when the knob 13 is screwed inwardly, thereby locking the plate 5 to the rail 10 for immobilizing the lens holder 40 with reference to housing 1, 3. Plate 5 and slider 15 are relatively slidable within limits established by a leadscrew 19 which is fixedly secured to plate 5 and traverses the jaw 15c of slider 15. Thus, slider 15 forms an extension of limited relative mobility of plate 5 and lens holder 40. A stud 50 projecting from plate 5 is strodded by bifurcations 15f of slider 15.

Stem 25 of knob 12, rotatably journaled in tube 14, carries a helical gear 17 which meshes with a similar gear 16 having inner threads 18 in engagement with leadscrew 19. Thus, rotation of the knob 12 shifts the plate 5, together with lens support 40, relatively to the slider 15 and therefore to the rail 10 to which the slider had previously been clamped in the aforedescribed manner. The extent of the vernier adjustment carried out by means of knob 12 can be read with the aid of scale markings 12' on the knob and on a head 14a of tube 14.

The rear wall of housing part 3 carries a ring 36, flush with its inner surface 29, confronting a flange 34 on an extension of lens mount 41. These two elements form coacting stops which define a limiting position of lens holder 40. With members 5 and 15 initially spaced apart, and upon release of locking knobs 11 and 13, the mobile assembly may be shifted into that limiting position which advantageously does not correspond precisely to a focusing position of the objective; for exact focusing, slider 15 is clamped by knob 11 whereupon knob 12 is rotated to effect a slight separation of coacting steps 34, 36, knob 13 being then tightened to immobilize the lens support 40.

In FIGS. 3, 4 and 4A we have shown a generally similar system wherein, however, a separate rod 26 is fixedly mounted in housing 1, 3, near the bottom thereof, with the aid of a pair of brackets 27, 27'. Rod 26 carries a set of peripherally grooved discs 22 which are axially spaced thereon and may be adjustably mounted with the aid of setscrews or the like. The grooves of discs 22 represent detent formations selectively engageable by an indexing formation 23 in the shape of a bar secured to a slider 115 and attached, by a pin 23a playing in a pair of slots 11c, to an extension 11b of the stem 11a of knob 11 which here is longitudinally slidable, along the common axis of knobs 11—13, on the stem 25 of knob 12. The latter stem, as in the preceding embodiment, carries a helical gear 17 in mesh with a similar gear 16 whose inner threads 18 engage a spindle 19 rigid with mobile plate 5. Pin 21 in plate 5 and its extension 5a again transmits the clamping pressure of knob 13 to rail 10 when the knob is screwed inwardly. Boss 20a of disc 20 here surrounds the stem 11a without clearance. Gear 17 turns in an extension 5c of plate 5.

The operation of the embodiment of FIGS. 3, 4, 4A differs from that of FIGS. 1 and 2 only in the manner in which the slider is arrested preparatorily to an operation of knob 12 to bring the objective 2 into the correct focusing position, e.g. as determined by a reflex-type viewfinder or by a conventional ground glass plate at the back of the camera. Thus, in this instance the knob 11 is pulled out to decouple the slider from the rod 26 after the clamping connection between lens support 40 and rail 10 has been loosened by rotation of knob 13. A spring 24, linking the slider 115 with extension 11b of stem 11a, tends to return the bar 23 to its indexing position as soon as this bar is aligned with another detent disc 22. Slots 11c afford the necessary relative mobility to slider 115 and knob assembly 11—13.

Figure 5:
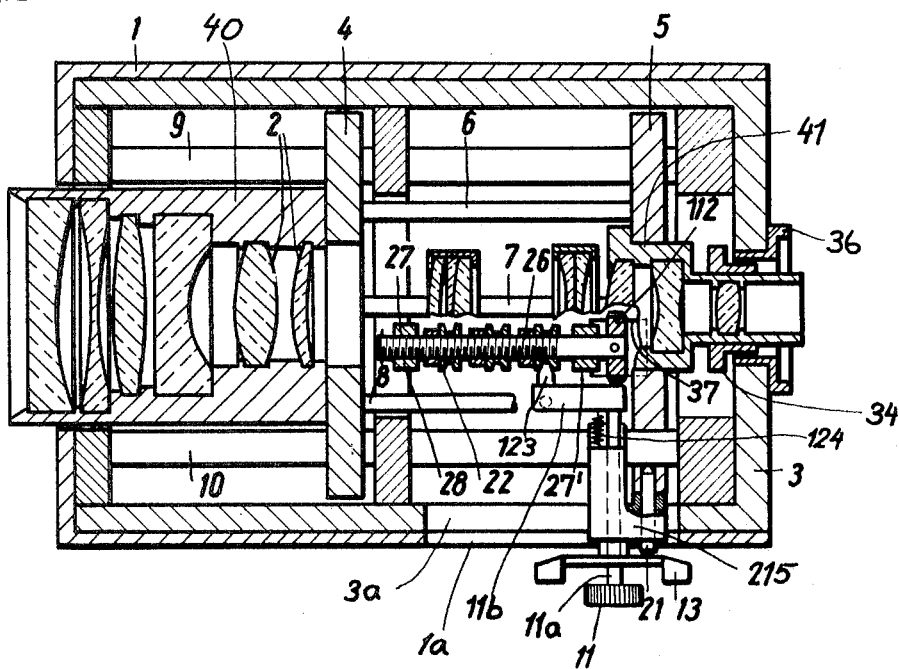
FIG. 5 is another axial sectional view, similar to FIGS. 1 and 3 but drawn to a larger scale and representing a further embodiment.

In FIG. 5 the rod 26 is shown as a threaded spindle which is matingly engaged by internal threads 28 of bracket 27, acting as a stationary nut, and which also has an unthreaded portion supported by the second bracket 27'. A milled knob 112, rigid with spindle 26, projects outwardly through a slot 37 in the bottom of the objective housing for manual rotation.

A bar 11b, carrying a lug 123, is an extension of the stem 11a of knob 11 which is longitudinally slidable, as in the preceding embodiment, to detach this lug against the force of a spring 124 from a previously engaged indexing disc 22, several of which are screwed onto the threaded portion of spindle 26 between the lugs 27 and 27' and are immobilized thereon in selected positions. Spindle 26 has limited axial mobility in its bearings 27, 27'. The third knob 13 coacts, as in the aforedescribed embodiments, with a pin 21 which is lodged in plate 5 and extends toward rail 10 for clamping engagement therewith, knob 13 being threadedly held in a slider 215 rigid with plate 5.

In operation, after rotation of knob 13 to release the locking pin 21, knob 11 is withdrawn to pull the lug 123 away from a previously engaged disc 22 whereupon the knob and the lug are axially shifted to engage another disc. As the slider 215 carrying the stem 11a is fixed with reference to plate 5, this displacement also entrains the objective 2 with its support 40. The final adjustment is carried out by the rotation of knob 112 and spindle 26 which axially entrains the lug 123 to a limited extent until the projected image is properly focused upon the receiving surface of the camera.

Stem 11a in FIG. 5 may have a noncircular (e.g. square) profile to keep the bar 11b from swinging about the axis of knob 11. This bar may also be stabilized by resting on the bottom surface of the objective housing while sliding parallel to its axis.

In FIG. 6 we have shown a part 141 of the rear lens mount of the objective, this part carrying a boss 142 offset from the optical axis in which a bolt 32 is threadedly received to form an adjustable abutment surface 131 coacting with the inner wall surface 29 of the housing portion 3. Bolt 32 can be locked in a selected position, as read by markings 35' and 35", with the aid of a counternut 33 to establish the terminal position of the objective. Naturally, several such stops can be provided at different locations around the optical axis.

In FIG. 7 we show a modification of the backstop 34 of FIGS. 1 and 3 which is here threadedly supported on the rear end of lens mount 41 and is locked in position with the aid of screws 132 and a threaded washer 133 serving as a counternut. Shoulder 31 forms again an abutment for the rear wall surface 29 of housing portion 3 whose window 30 is in line with the lens axis. If desired, a ring 36 as shown in FIGS. 1 and 3 may be fitted in this window which in such case will have to be slightly enlarged.

We claim:

1. In a camera having a housing and lens means in said housing with a changeable back-focal length, the combination therewith of a guide member axially extending in said housing; support means for said lens means including a guided member axially slidable on said guide member; a leadscrew drive including a first threaded element and a second threaded element in mating engagement with each other, one of said elements being rotatable about an axis parallel to said guide member, said first element being axially fixed with reference to one of said members; releasable coupling means for connecting said second element with the other of said members in any of several relative axial positions of said members; first manipulating means linked with said coupling means; and second manipulating means coupled with said one of said elements for rotating same relatively to the other of said elements to focus said lens means upon a receiving surface fixed with reference to said housing.

2. The combination defined in claim 1, further comprising third manipulating means for immobilizing said guided member on said guide member in a selected relative position.

3. The combination defined in claim 2 wherein at least two of said manipulating means comprise coaxial knobs.

4. The combination defined in claim 3 wherein said first, second and third manipulating means respectively include a first knob, a second knob and a third knob substantially centered upon a common axis transverse to said guide member, said first and second knobs having nested stems traversing said third knob.

5. The combination defined in claim 2 wherein said third manipulating means includes a knob rotatable about an axis transverse to said guide member and further includes a pin parallel to said transverse axis and overlain by a peripheral portion of said knob, said guided member having an extension threadedly receiving said knob whereby the latter may be screwed in the direction of said transverse axis to exert pressure upon said pin, said guide member being a rail engageable by said pin under pressure from said knob.

6. The combination defined in claim 5 wherein said extension is a slider limitedly displaceable along said rail with reference to said guided member.

7. The combination defined in claim 1, further comprising a plurality of axially spaced indexing formations, said coupling means including a complementary detent formation selectively engageable with said indexing formations.

8. The combination defined in claim 7 wherein said second element is a spindle, said indexing formations including a plurality of grooved nuts threaded onto said spindle and immobilized thereon.

9. The combination defined in claim 1, further comprising first stop means on said housing and coacting second stop means on said support means for defining a limiting position for said lens means.

10. The combination defined in claim 9 wherein one of said stop means comprises an axially adjustable abutment.